April 18, 1944. T. O. SUMMERS, JR 2,346,798
NAVIGATIONAL INSTRUMENT
Filed Feb. 23, 1939 6 Sheets-Sheet 1

Inventor
Thomas O Summers Jr.
Attorney

April 18, 1944.　　　T. O. SUMMERS, JR　　　2,346,798
NAVIGATIONAL INSTRUMENT
Filed Feb. 28, 1939　　　6 Sheets-Sheet 2

Inventor
Thomas O Summers Jr.
Attorney

April 18, 1944.  T. O. SUMMERS, JR  2,346,798
NAVIGATIONAL INSTRUMENT
Filed Feb. 28, 1939   6 Sheets-Sheet 3

Fig_5_

Fig_11_

Inventor
Thomas O Summers Jr.
Attorney

Patented Apr. 18, 1944

2,346,798

UNITED STATES PATENT OFFICE 2,346,798

NAVIGATIONAL INSTRUMENT

Thomas O. Summers, Jr., Los Angeles, Calif.

Application February 28, 1939, Serial No. 258,931

8 Claims. (Cl. 73—152)

This invention relates to instruments which are operated at least partly by movements of the structure on which the instrument is mounted. More specifically, it relates to navigation instruments of the type useful in indicating the character, extent and/or rate of movement of the instrument's mounting, especially when the instrument is mounted on an aircraft.

A general object of the present invention is to provide an instrument capable of indicating the rate of movement of the instrument's carrier with respect to another object, or stated more specifically, to provide an instrument capable of indicating the rate of travel of a vehicle relative to the earth's surface. Whereas, the instrument of the present invention is capable of general application, it has been designed primarily as a "ground speed indicator" for airplanes.

A more detailed object is the provision of an instrument which finds utility in navigation in that it is sensitive to changes in the velocity of an aircraft, or any other type of vehicle upon which the instrument may be mounted, and is capable of summing up such changes of velocity, as they occur, so as to give a cumulative reading of the velocity attained as the result of several preceding accelerations.

In aerial navigation as in any other kind of navigation, it is important to know the velocity of the carrier, but heretofore the velocity indicator has had its greatest usefulness only so long as the medium the carrier traversed remained still or moved at a known velocity, and due to the variability of air as a medium, the velocity indicator has been least useful to aerial navigation where it is most needed. A further object of the present invention, therefore, is to provide a velocity indicator that will function independently of the medium traversed by the vehicle. To this end, I propose by the present invention to provide a construction to measure the accelerations of a vehicle, especially an aircraft, and to provide also a suitable integrating mechanism to register on a direct reading dial the time integral thereof, i. e., the velocity of the vehicle.

Yet another object is to enhance the accuracy of my improved velocity indicator by providing means for maintaining at least that portion of the instrument which is sensitive to accelerations in the proper fixed attitude with respect to the earth's surface in order to prevent the acceleration-sensitive portion of the instrument from being influenced by the force of gravity and/or any other force produced by other than an acceleration of the vehicle in a fore and aft direction.

A further object of the present invention is to provide a velocity indicator of the character described including a mass, mounted so as to be sensitive to accelerations of the vehicle, but operably coupled to an integrating mechanism—the operation of which depends upon both the extent and duration of each acceleration to which the mass is sensitive—adapted to translate the accelerations as they occur into the actual velocity attained by the vehicle as the result of various preceding accelerations.

A still further and more detailed object of my invention is to provide, as one embodiment thereof, a velocity indicator adaptable to various types of vehicles including water craft and aircraft; wherein the apparatus which actuates the integrating mechanism includes a body movable through a distance proportional to the accelerations which the vehicle experiences; wherein the supporting mechanism for the movable body is suspended so as to be self-leveling and capable of maintaining a substantially fixed attitude with respect to the earth's surface regardless of pitching and/or rolling of the carrier; and wherein this self-leveling supporting mechanism is designed so that movement of the mobile body, which of course entails shifting of the center of gravity of the entire suspended mechanism, will have no tendency to disturb the attitude thereof with respect to the earth's surface.

A further object in this connection is to design the self-leveling mechanism so that it serves to keep the device at approximately the proper position even when the apparatus is left idle for prolonged periods, and thus to avoid the liability that difficulty might be encountered in returning the apparatus to the proper operative attitude when again it is placed in operation.

Another object of the present invention is to provide means which remain effective as long as the instrument remains in operation, for insuring great accuracy in disposing the apparatus at the proper attitude with respect to the earth's surface which is necessary for its efficient, dependable, and accurate operation. Preferably, this object is attained through the expedient of a comparatively simple but highly accurate gyro vertical construction, the details of which also form a portion of the present invention. It should be mentioned, however, that aside from being useful in a velocity indicating mechanism, various other uses for such a gyro vertical, especially in conjunction with aircraft, will be apparent to those skilled in the art.

Another object of my invention is to provide means for automatically zero-setting the instrument occasionally, so as to prevent the building up of a cumulative error large enough to be of importance, from a large number of errors, each of which might in itself be so slight as to be indiscernible or negligible, and accordingly substantially unavoidable.

The invention possesses other objects and features of advantage, some of which, with the foregoing, will be set forth in the following description of the preferred form of my invention illustrated in the drawings accompanying and forming a portion of the specification. It is to be understood, however, that I do not limit myself to the showing made by the said drawings and description, as I may adopt variations of the preferred form within the scope of my invention as set forth in the claims.

Referring to the drawings.

In terms of broad inclusion, the present invention contemplates the provision of an instrument adapted for mounting in convenient location upon the vehicle, the velocity of which is to be shown, and comprises a mass mounted therein for movement in a fore and aft direction with relation to the vehicle so as to be sensitive to all accelerations thereof tending to vary the vehicle's velocity. To adapt the device for use upon a vehicle subject to pitching and/or rolling, or other movements causing it to change its attitude with respect to the horizontal, the acceleration-sensitive body is carried by a freely suspended structure adapted to retain its attitude regardless of any tipping of the carrier vehicle. In order to assure that the suspended structure is maintained at the exact attitude which is required for the accurate operation of the instrument, a highly accurate and dependable gyro vertical is incorporated therewith; and the entire suspended structure is so designed that it is slightly pendulous when the instrument is out of operation, so that whenever the instrument is left idle, the suspended portion of the device will be retained by gravity sufficiently close to its operating position for the gyro vertical to move it accurately to its proper attitude when operation is resumed.

Moreover, in that embodiment of my invention chosen for the present disclosure, the suspended structure, including a movable body which comprises a portion of the actuating means carried by the suspended structure, is so designed that even though the body moves with relation to the remainder of the suspended structure, thereby shifting the center of gravity of the entire suspended structure, no appreciable tendency develops to tilt the suspended structure from its proper, operative attitude. Means are provided for interpreting the extent of operation of the actuating means and comparing such extent with its duration, and thus deriving a direct reading of the velocity gained; and inasmuch as the reading is gained purely from the sum of the several accelerations which the carrier has previously experienced, the readings have no dependency upon the medium on or through which the vehicle is moving. Dependability of the instrument is enhanced by incorporating therewith a zero-setting mechanism which, whenever the instrument is permitted to come to rest, acts to return the indicating dial accurately to its zero-reading position, and thus remove any inaccuracy of reading which may have developed as the result of prolonged use, during which there might have developed a large number of errors, each of which was so small as to be negligible, but which might accumulate and in the aggregate cause the instrument to give a reading of such inaccuracy as to be of importance.

Referring now to that embodiment of my invention which is illustrated in the drawings, the velocity indicator there depicted comprises a housing 21, preferably of substantially cylindrical form and closed at its front end by a window 22 and at its after end by a plate 23, both of which are so fitted that they establish a substantially air-tight seal with the housing 21. The device is preferably adapted as by a flange 24, for mounting upon an instrument panel 26, with the interior mechanism, or at least the graduated dial 27, visible through the window 22.

The working mechanism of the instrument is supported within the housing 21 by a suitable gimbal mounting comprising preferably a gimbal member 28 including a pair of spaced parallel arms 29 and 31, joined at their after ends by a transverse bar having a trunnion 32 extending aft therefrom for suitable engagement with a pair of spaced anti-friction bearings 33 and 34 to support the outer gimbal member for free swinging movement within the housing about a longitudinal axis therethrough. The two arms 29 and 31 carry aligned anti-friction bearings 36 and 37 adjacent their outer ends, within which are revolubly supported trunnion shafts 38 and 39 extending laterally from the inner casing 41. These shafts 38 and 39 extend at right angles with respect to the axis of the bearings 33 and 34 and accordingly the inner casing 41 is supported for free universal swinging movement within the housing 21.

Cooperating elements

For the purpose of convenience in the description to follow, the operating mechanism carried by the inner casing 41 shall be considered as being made up of several distinct, but interdependent and cooperating elements, or groups of parts, to wit: the mass which is movable in a fore and aft direction and hence is sensitive to accelerations, this mass preferably taking the form of a bob 46 carried by a lever arm pivoted for movement about a vertical axis, with the result that the bob 46 is sensitive to fore and aft accelerations of the vehicle; a gyro vertical construction 47 adapted to retain the inner casing 41 in that position in which the lever's axis is vertical to insure that the bob is free at all times to move in a horizontal plane regardless of the attitude of the instrument's carrier; an actuating mechanism 48 of which the extent of operation is significant and determined by actuation of the bob; an integrating mechanism 49, the function of which is to interpret the extent of operation of the actuating mechanism in comparison to the period of time during which each such actuation occurs and thus translate its actuation into terms of absolute velocity gained by the vehicle as the result of the several precedent accelerations; and a zero-setting mechanism 52, the function of which is to remove from the instrument any cumulative error developed therein as the result of its being in use for a prolonged period during which time several small and hence negligible errors may occur but which might build up to a cumulative error of sufficient proportions seriously to impair the instrument's dependability.

Gyro vertical

The gyro vertical construction 47 comprises a rotor 61 carried by a shaft 62 suitably journaled for rotation within the casing 41, suitable anti-friction bearings 63 and 64 being employed for the support of the shaft 62 and rotor 61. Preferably, the rotor 61 is air driven; and for this purpose, instead of supplying air at pressure greater than atmospheric, it has been found more desirable to exhaust air from the interior of the air-tight housing 21 so as to permit air at atmospheric pressure to enter through suitable nozzles 66, adapted to direct their jets against blades 67, formed in the periphery of the rotor 61. One of the important considerations in this connection is to provide means of entry of the air to the rotor housing in such a manner as to prevent the development of a torque upon the structure carrying the nozzles, and for this purpose passageways are provided which extend axially of the gimbal supports themselves. Air is permitted to enter the axial passageway 71 in the trunnion 32 of the gimbal member 28 through a transverse passage 72 communicating with a circular chamber 73 in the bore of the head 74 which carries the outer anti-friction bearing 34; and this circular chamber 73 communicates with the atmosphere preferably through a suitable screen 76 at the after end of the head 74. The inner end of the axial passageway 71 communicates with a duct 77 within the gimbal arm 29, with the outer end of which a transverse passage 78 in the shaft 39 communicates, leading to an axial passageway 79 in the shaft 39 which, in turn, leads to a vertical passage 81 in the inner casing 41, which communicates with a circular passage 82 in the under surface of the top of the casing 41. This circular passage 82 communicates with a vertical duct 83 leading to each of the nozzles 66.

Figures 1, 2:
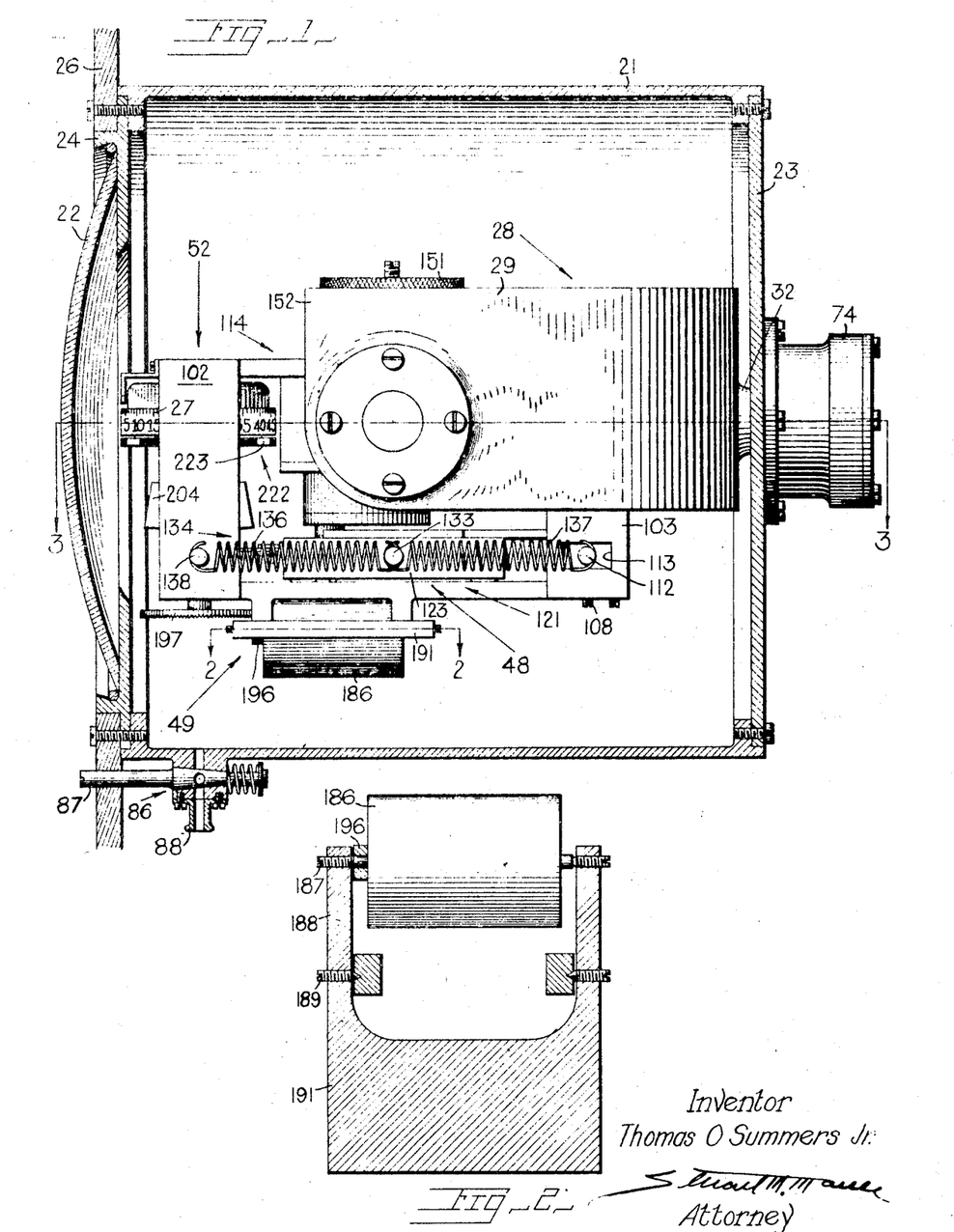
Figure 1 is a longitudinal, vertical, medial sectional view taken through the housing of a velocity indicator embodying the principles of the present invention, and showing the internal mechanism in side elevation.
Figure 2 is an enlarged detail view in horizontal section of a part of the integrating mechanism, the plane of section being indicated by the line 2—2 of Figure 1, and the direction of view by the arrows.
Figure 3:
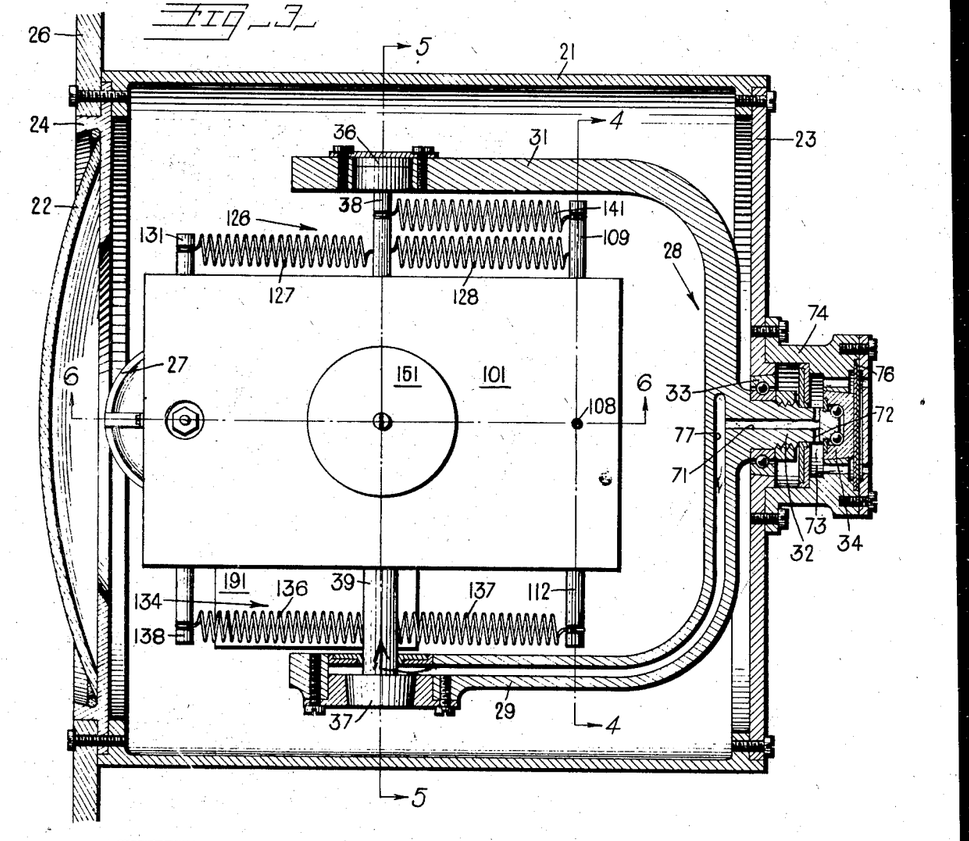
Figure 3 is a horizontal sectional view taken through the housing and outer gimbal arm on the line 3—3 of Figure 1, but showing the inner suspended structure in top plan.
Figure 4:
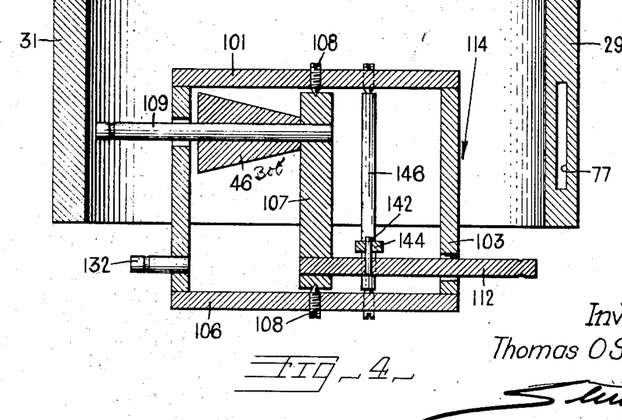
Figure 4 is an enlarged detail view in transverse vertical section taken through the outer gimbal arm and the pendulum structure supported thereby, the plane of section being indicated by the line 4—4 of Figure 3, and the direction of view by the arrows.
Figure 5:
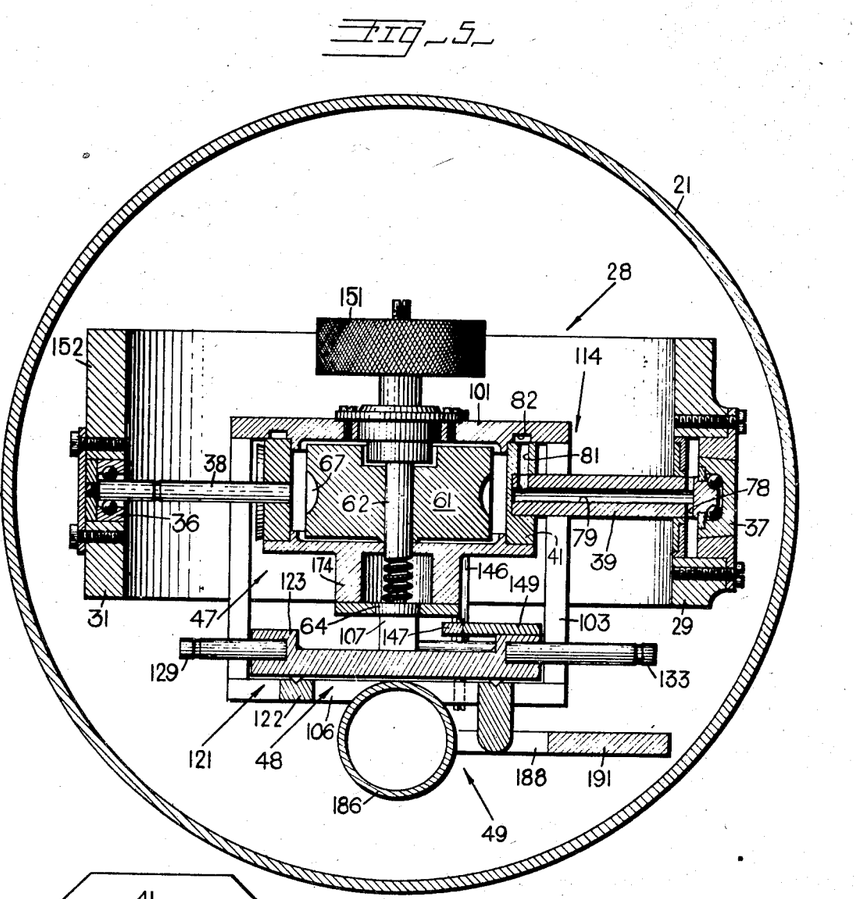
Figure 5 is a view similar to Figure 4, taken upon the line 5—5 of Figure 3, with the direction of view as indicated.

Means are provided for exhausting air from the housing 21. A valve 86, preferably controlled manually by means 87 accessible at the instrument panel 26, controls flow through a tube 88 leading from preferably the bottom of housing 21 (see Figure 1).

Thus it may be seen that when air is exhausted through the tube 88 and open valve 86, atmospheric pressure outside the instrument will cause air to rush through the screen 76 and thence by the axial passageways described, to the nozzles 66 which, because of the manner in which they direct their jets against the blades 67 of the rotor 61, produce the desired spinning of the rotor.

Means are provided for causing the gyro vertical 47 automatically to assume a position wherein its axis of spinning is substantially vertical. However, since the details of construction of the erecting mechanism are capable of general application and therefore do not form a portion of the present invention, it will suffice for the purpose of the present disclosure to explain that this erecting mechanism comprises a plurality of recesses 91 (see Figure 9) in the walls of the inner casing 41 and arranged at suitably spaced intervals about the vertical axis of the instrument.

Figure 9:
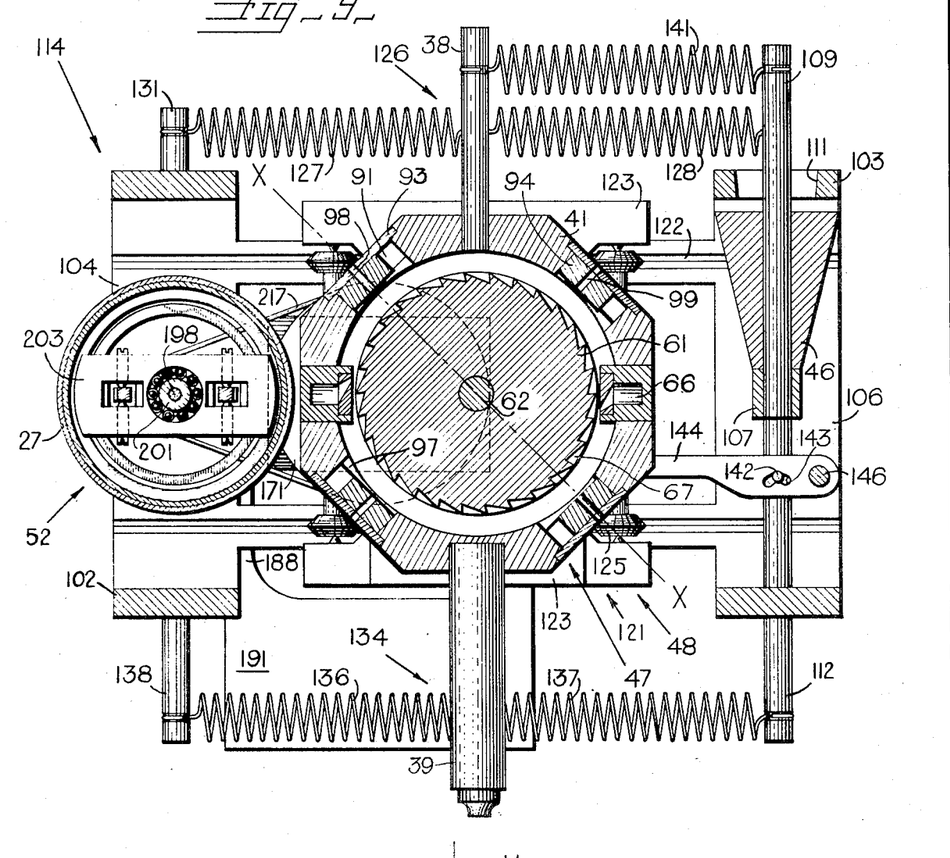
Figure 9 is a horizontal sectional view taken upon the line 9—9 of Figure 6, with the direction of view as indicated.

Each of the recesses 91 communicates with the interior of the casing 41 and contains a roller 94 adapted to roll back and forth upon the bottom surface of the associated recess and thereby control escape of air from the interior of the casing 41 and through a downwardly directed orifice (not shown) in the bottom wall of that recess. Inasmuch as each of these downwardly directed jets is offset from the axis of the gimbal mounting of the gyro vertical, the reactive forces imposed upon the gyro vertical as the result of flow of air through the orifices whenever the rollers 94 are displaced from their respective positions wherein they close the orifices, develop torque upon the gyro vertical in such a direction that the resultant precession causes the gyro vertical to erect itself back to its normal, substantially vertical position. The details of construction and principles of operation of this improved erecting mechanism form the subject of my co-pending application, Serial No. 465,241, filed November 11, 1942.

Acceleration sensitive mass

It is apparent, therefore, that so long as the rotor 61 continues to spin, it will retain its position with its spinning axis vertical. Therefore, it can be relied upon to retain accurately the structure which enables the bob to move substantially in a fore and aft direction in a horizontal plane about a vertical axis, and thus avoid its being sensitive to any accelerations except those having influence upon the actual speed of the carrier in a fore and aft direction. For this reason, the support for the acceleration-sensitive mass 46 is made rigid with the inner casing 41, and to this end, the top 101 of the inner casing 41 is extended fore and aft from the casing 41; and dependent from these extended ends of the top 101 are fore and after corner posts 101 and 103, respectively. The lower ends of the forward corner posts 102 are joined by a transverse member 104, whereas the corresponding portions of the after corner posts 103 are joined by transverse member 106. A vertical shaft 107 is journaled for substantially frictionless rotary movement, being supported preferably by pivot pins 108 in the after transverse member 106 and the after end of the extended top 101 of the inner casing, respectively. This vertical shaft 107 provides the pivotal support for the bob 46, which is connected thereto by a horizontal arm 109, the outer end of which extends beyond the bob 46 through an aperture 111 in the proximal after corner post 103. The vertical shaft 107 also carries another, but oppositely extending horizontal arm 112, which extends beyond the proximal after corner post 103 through a suitable aperture 113. Consequently, when the instrument's carrier experiences an acceleration in its fore and aft direction, the mass of the bob 46 will cause the arm 109, upon which it is carried, to lag with respect to the remainder of the mechanism, imparting rotary motion to the vertical shaft 107, and movement to the other horizontal arm 112 which is equal and opposite to that of the arm 109.

Therefore, whenever there is a change in the acceleration of the carrier, the vertical shaft 107 will turn slightly, with the arm 109 moving in one direction and the other arm 112 in the other direction. Advantage is taken of this movement of the bob 46 and its supporting shaft 107, to limit the extent of operation of the actuating mechanism 48.

*Actuating mechanism*

Inasmuch as the framework 114 which carries the acceleration-sensitive bob 46 is maintained at a predetermined attitude by the gyro-vertical 47, it is convenient to employ, as the actuator 48, a mass 121 movable along a horizontal portion of the framework 114. To provide this horizontal portion, parallel spaced longitudinal trackways 122 extend between the transverse members 104 and 106; and it is upon these tracks 122 that the mass 121, which constitutes the actuator 48, is supported. The mass 121 comprises a body 123 having transverse shafts 124 pivotally supported thereon, and rollers 125 engaged upon the tracks 122 to guide the body 123 in fore and aft movement with respect to the framework 114. It is apparent, therefore, that the actuator 48 in the present invention takes the form of a mass adapted to be sensitive to inertial forces and moved with relation to the framework 114 by the same accelerations which effect movement of the bob 46.

Figures 10, 12:
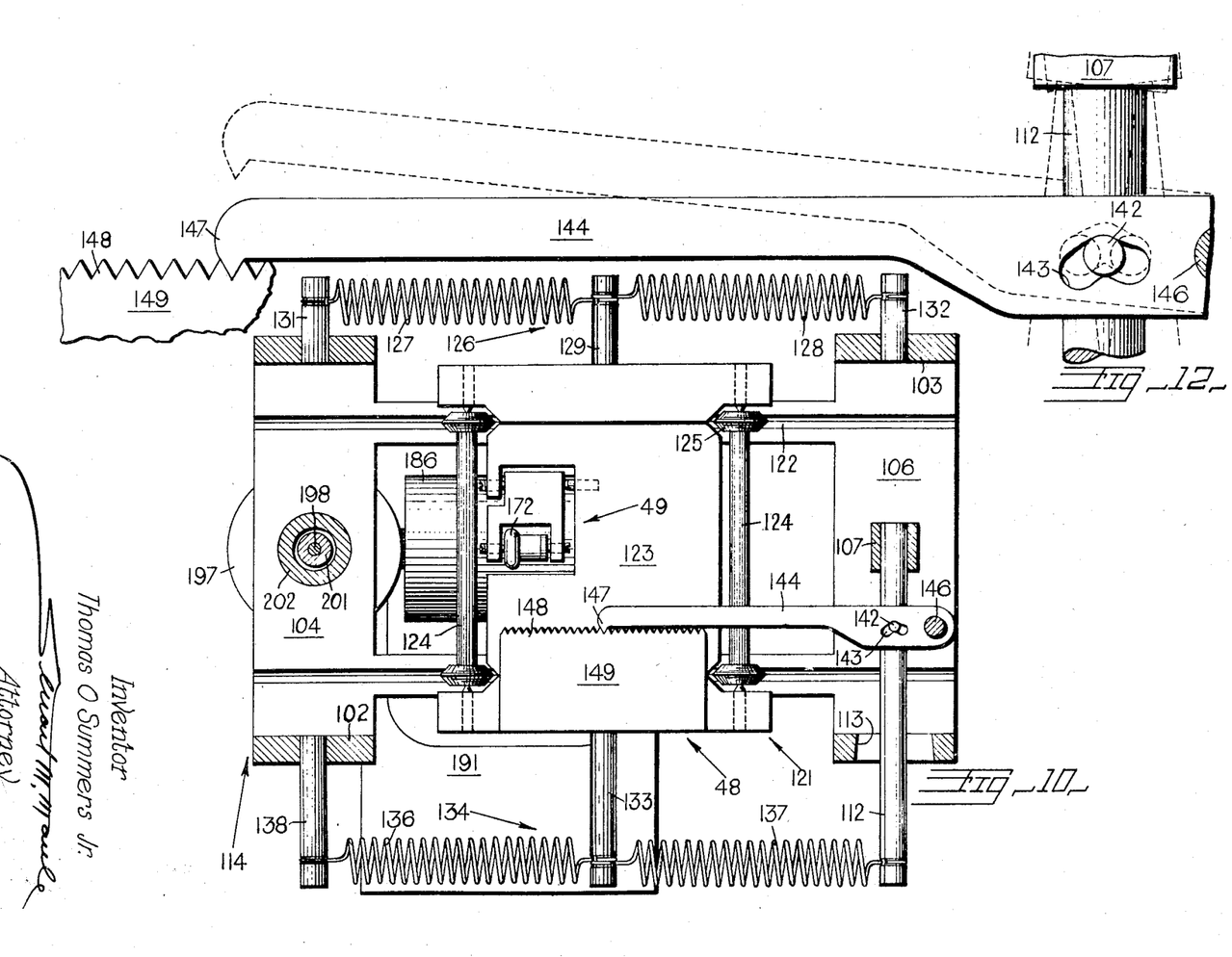
Figure 10 is a view similar to Figure 9, the plane of section being indicated by the line 10—10 of Figure 6 and the direction of view by the arrows.
Figure 12 is an enlarged detail view of the automatic detent which forms a portion of the structure illustrated in Figure 10. The range of its movement is indicated in broken lines.

Means are provided for correlating the actuator 48 and the bob 46 in such a manner that the bob serves to limit the extent of movement of the actuator 48 proportionally with the extent of the acceleration responsible for its movement. A pair 126 of equal coil springs 127 and 128 extend forward and aft, respectively, from a laterally extending anchorage post 129 rigid with the mobile body 123. The forwardly extending spring 127 is under tension between the common anchorage post 129 and a fixed anchorage post 131 rigid with the associated forward corner post 102, whereas the rearwardly extending spring 128 is similarly engaged upon a fixed anchorage 132 rigid with the associated after corner post 103. Another common anchorage pin 133 extends laterally from the other side of the movable body 123 in axial alignment with the anchorage pin 129, and it also supports the inner ends of a pair 134 of opposed tension springs 136 and 137. These springs also are of equal strength, but preferably of materially less strength than the springs 127 and 128. The forward spring 136 has its other end engaged upon an anchorage post 138, carried by the other forward corner post 102, whereas the after end of the coil spring 137 is engaged upon the horizontal arm 112. The horizontal arm 109 preferably is adjacent the top of the framework 114 and in the plane of the trunnions 38 and 39; therefore the trunnion 38 serves as a convenient anchorage for the forward end of a coil spring 141, the after end of which is engaged upon the extended end of the upper horizontal arm 109. The parts are so proportioned and arranged that the spring 141 balances the spring 137 and this can most easily be attained by employing springs of equal strength, and by so proportioning the arms 109 and 112 that the distance between the vertical axis of the shaft 107 to the point of attachment of the spring 141 upon the arm 109 is equal to the distance from the vertical axis of the shaft 107 to the point of attachment of the spring 137 to the arm 112. Moreover, the tension of the spring 141 remains substantially constant, inasmuch as it is under tension between the trunnion 38, which is fixed as far as any appreciable fore and aft movement with relation to the framework 114 is concerned, and the arm 109 which is permitted but very limited movement, as determined by the size of the aperture 111. It becomes apparent, therefore, that each of the four springs 127, 128, 136 and 137, is under tension between an anchorage post carried by the movable body 123 and an anchorage post carried by the framework 114 with respect to which the movable body can move, whereas the fifth spring 141 is under tension between anchorage posts, both of which are carried by the framework. All of the springs are so selected that they urge the mobile mass 121 to assume a position of equilibrium with its transverse vertical center plane substantially coincident with that of its supporting framework. Moreover, the parts are so proportioned and arranged that when the movable mass 121 is in this position, the vertical shaft 107 assumes a position with its transversely extending horizontal arms 109 and 112 substantially parallel to the said center planes, under which circumstances a pin 142 carried by the lower horizontal arm 112 is disposed midway between the ends of an angular slot 143 (see Figures 10 and 12) in a detent arm 144, which is pivotally mounted as by a second vertical shaft 146 adjacent the after end of the framework 114. From the shaft 146 the detent 144 extends forward to dispose its other end 147 in operative relation to the serrated edge 148 of a plate 149, carried by the movable body 123. The relationship between the pin 142, the slot 143, the arm 144, and the plate 149, is such that when the pin 142 is midway between the ends of the slot 143 (as shown in Figure 10 and in full lines in Figure 12), the detent engages the plate 149 effectually to anchor the movable body against movement with respect to the framework; whereas, when the pin 142 is caused to move either forward or aft of the described intermediate position, the detent is caused to swing substantially to the broken line position indicated in Figure 12, so that it releases the plate 149 and leaves the movable body free to move upon its framework as the result of the same acceleration as that which has caused the bob 46 to release the detent. This motion of the mobile mass 121 will continue until the co-operating springs readjust themselves to the position attained by the mass 121 with relation to the acceleration which has produced the described movement. It is apparent, therefore, that whenever an acceleration first occurs, the mobile mass 121 will be freed for movement because of the withdrawal of the detent; and, further, the mobile mass will then assume a certain position with relation to its supporting framework as determined by the extent of the acceleration which has produced its movement. Furthermore, the detent 144 will serve to lock the mobile mass 121 in the position which is appropriate to the acceleration which has produced its movement, thus preventing the mobile mass 121 from being carried on by its own momentum past the position appropriate to a given acceleration, and therefore will prevent the development of any yawing or oscillating action of the mobile mass upon its framework. The tendency for the development of such yawing action can best be explained by considering a hypothetical, simple apparatus comprising merely a mass supported on a carrier vehicle between springs and otherwise free to move horizontally in a fore and aft direction. Upon an acceleration of the carrier, the carrier will, of course, move relatively to the mass, thereby causing the springs to exert a force against the mass, in consequence of which there also will be an acceleration of the mass proportional to the force exerted by (and hence the displacement of) the springs. But so long as this relative movement between the mass and the carrier continues, the displacement of (and hence the force exerted by) the springs, will, of course, increase accordingly. Thus the acceleration of the mass will be built up gradually until such time as its acceleration becomes equal to that of the carrier. The relative movement between the two, however, does not desist the instant their accelerations become equal. On the contrary, the acceleration of the mass will continue to increase; in fact it will actually surpass that of the carrier, and not until the velocities of the two become equal will the acceleration of the mass reach a maximum. But when the velocities of the mass and the carrier do become equal the relative movement between the two will not even then desist; for at that instant the mass will be experiencing an acceleration greater than that experienced by the carrier at that instant, and consequently after this instant the mass will experience the greater velocity also. Hence there will result a reversal in the direction the mass moves with respect to the carrier. That is, the relative movement between the mass and the carrier then will be such that there will be a falling off in the force exerted by the springs against the mass; and inasmuch as this falling off will result in a proportional decrease in the acceleration of the mass, its velocity will drop accordingly until again the velocities of the two become equal. This time, however, the carrier will be experiencing the greater acceleration; and, therefore, there again will follow a reversal in the direction the mass moves with respect to the carrier. That is, the springs again will be caused to exert a force against the mass. This action will tend to be repeated indefinitely, producing an oscillation of the mass with respect to its carrier about the position whereat its acceleration is equal to that of the carrier. In other words, the acceleration of the mass recurrently falls short of and then exceeds that of the carrier; and, since the actual acceleration of the mass is always proportional to its displacement from its original position, the displacement of the mass actually measures the acceleration of the carrier when, and only when, the mass occupies the position at which its acceleration is equal to that of the carrier.

Hence, the necessity for the detent 144, the function of which is to drop into engagement with the serrated plate 149 the instant the acceleration of the mobile mass 121 becomes equal to that of its supporting framework 114 and thus preclude oscillation of the mass 121 about its position with relation to its supporting framework, which is appropriate to the acceleration which has caused its movement thereupon. In other words, the detent drops into engaging position the instant that the mass 121 reaches that position upon its supporting framework wherein the aggregate force of the springs acting thereagainst is equilibrated by the reactive inertial force of the mobile mass; and accordingly, the mass 121 becomes fixed with relation to the framework, and is thus prevented from oscillating back and forth past that position at which its acceleration in space is equal to that of the carrier.

It becomes apparent, therefore, that the apparatus includes a framework 114 suspended by a gimbal mounting for free universal pivotal movement, and carrying a mass 121 caused to move upon said framework and in a fore and aft direction with relation to the vehicle carrying the instrument, the extent of such movement being determined by and preferably proportional to the magnitude of the acceleration responsible for its movement. When the device is subjected to an acceleration, the bob or weight 46 is displaced with relation to the framework, so as to permit operation of the actuator; and the bob remains displaced until the actuator builds up in the spring 137 sufficient force (or sufficiently relieves the force already built up therein, depending upon the direction of the acceleration) to return the bob to its anchoring position. It is clear, therefore, that the movable mass 121 (which in the present embodiment serves as the actuator for the indicating mechanism and derives the energy for its operation from the same acceleration as that which actuates the bob 46) is caused to move upon its tracks 122 through a distance proportional to the acceleration responsible for its movement, whereupon the bob 46 acts to prevent any further movement of the mass 121 with relation to the framework 114 so long as the acceleration which the carrier is then experiencing, prevails.

Astatic supporting structure

However, when, as in the present modification, the actuator takes the form of a mass which is movable within the instrument in response to the same accelerations as those which actuate the bob 46, a rather complicated problem of design is presented. It is essential, of course, for the accurate operation of the instrument, that the framework 114 remain in that position wherein the axis of the shaft 107, about which the bob 46 moves, is vertical, otherwise movements of the bob will be influenced by factors other than fore and aft accelerations. And yet, any movement of the mass 121 will disturb the center of gravity of the framework 114 and the parts supported thereby; and inasmuch as the framework is suspended in gimbals so as to permit it to retain its attitude while the carrier vehicle pitches and banks, any such shifting of the suspended structure's center of gravity might be expected to disturb the framework 114 from that attitude thereof which is necessary for the instrument's satisfactory operation. It is to compensate for this tendency for the moving mass 121 to tip the supporting framework that the suspended structure has been designed as what might be termed an astatic pendulum, the construction and arrangement of which also form an important part of the present invention.

Briefly, the problem is to provide a pendulous structure which includes as a portion thereof (contributing to its total mass) a body movable with relation to the remainder of the structure and in response to accelerations experienced thereby, and which in spite of such movement will develop no tendency to tip from its original attitude. That the suspended framework 114 supported for universal movement by its gimbal and carrying the movable mass 121, satisfies these requirements, can best be understood by reference to the diagram illustrated in Figure 13, wherein a frame $f$ is shown suspended from a suitable pivot support P. The frame $f$ of the diagram corresponds to the framework 114; and a body B supported on the frame $f$ at the distance R from the pivot P corresponds to the mass 121. The body B is free to move longitudinally of the frame $f$, due to its own inertia, when the frame $f$ is subjected to an acceleration acting in a direction parallel to the longitudinal axis of the frame $f$. Movement of the body B with relation to the frame $f$ is opposed by two equal, opposed tension springs S, of which the constant of proportionality is C. When the pivot P moves horizontally, say in the direction of the arrow M, in response to an acceleration of the carrier, assuming friction to be negligible the entire frame $f$ moves similarly, since it is counterbalanced by a suitable mass H; and the body B will be moved upon the frame $f$ by its inertial forces and in the opposite direction. This will build up energy in the springs to the extent that their reaction against the frame $f$ produces a torque $T_1$ in the direction indicated. Moreover, $T_1 = RCx$, where $x$ represents the linear displacement of the body B.

Figure 13:
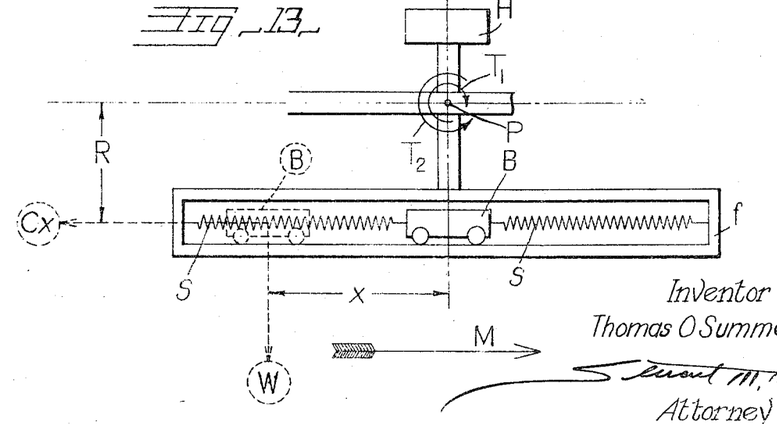
Figure 13 is a diagram used in the explanation of the theory of operation of the astatic pendulum.

But the displacement of the body B which causes removal of its center of gravity from directly under the pivot P, results in the development of another torque $T_2$, which is in the opposite direction; and this torque $T_2$ is equal to the weight of B, or W, multiplied by the displacement, or $x$, that is, $T_2 = Wx$. Hence, by making $W = RC$, $$T_1 = T_2$$

Therefore, if the springs S be so selected that their constant of proportionality multiplied by the distance R, is equal to the weight of the body B, any displacement of the body B from its position of rest below the pivot P due to an acceleration of its carrier in the direction in which the body can move upon its support, will result in the development of opposite torques upon the frame about its pivotal support, and since the opposed torques are equal, they will equilibrate each other, and no tendency for the frame $f$ to tilt from its original attitude will arise.

The present apparatus, therefore, is so designed and proportioned that the constant of proportionality of all four springs 127, 128, 136, 137 acting together, multiplied by the distance from the point of intersection of the gimbal axes to the line of movement of the center of gravity of the mass 121, is equal to the weight of the mass 121. Moreover, the framework including all the parts supported thereby except the mass 121, is accurately counterbalanced by a suitable weight 151 affixed to the top 101 of the inner casing 41. Therefore, when the weight of the mass 121 is added to the framework 114, the suspended structure would become definitely pendulous about the longitudinal gimbal axis if means were not provided for counterbalancing the weight of the mass 121. This is easily accomplished by means of an extension 152 upon the upper side of the gimbal member 28, the effect of which is to make the entire suspended structure insensitive to transverse accelerations. Furthermore, the addition of the weight of the mass 121 to the suspended structure after the suspended structure has been counterbalanced would appear to make that structure heavily pendulous about the transverse gimbal axis; but such is not the case, for the reason that the mass 121 is free to move in a line parallel to the longitudinal axis. The situation as it actually exists is that so long as the gyro vertical 47 remains in operation and the framework remains with the plane of movement of the mass 121 thereon horizontal, the suspended structure is completely devoid of pendulosity; but when the instrument is permitted to become idle and the suspended structure is no longer under the influence of the gyroscope, the framework 114 is apt to tilt, and at least a portion of any such tilting would most probably be about the transverse axis, causing the path of possible movement of the mass 121 to become tilted, whereupon the mass 121 will be motivated downwards, lowering its center of gravity, with the result that the entire suspended structure acquires a sufficient degree of pendulosity to assure that it remains sufficiently near its proper, operating position for the gyro vertical to erect itself when it again is placed in operation. Hence, the necessity for "caging," or anchoring the suspended structure before the instrument is left idle, is obviated.

It should be mentioned that the extent of movement of the bob 46 is so limited by the apertures 111 and 113 (which are shown on the drawings in exaggerated size), that when the bob shifts from one extreme to the other of its movement, the effect upon the center of gravity of the entire suspended structure is almost so slight as to be negligible.

However, what little effect movement of the bob 46 might have toward shifting the center of gravity of the entire suspended structure, works advantageously, inasmuch as it always is in that direction which tends to compensate for any friction which might be present, opposing movement of the mass 121.

Another important detail of construction is that the plane of oscillation of the bob 46 coincides with the horizontal plane of the axis of the gimbal trunnions 38 and 39. This arrangement prevents the liability of disturbing the equilibrium of the pendulous structure when movement of the bob 46 is arrested by engagement of the arm 109 against an end of the slot 111, and of the arm 112 against an end of the slot 113.

Integrating mechanism

Figure 11:
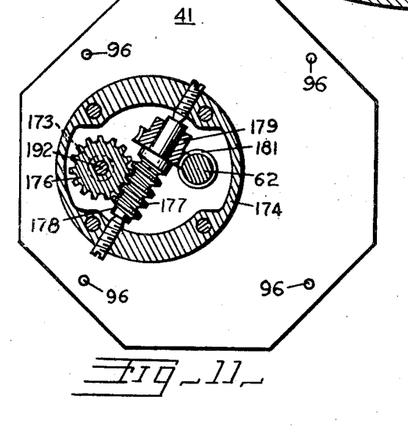
Figure 11 is a detail view in horizontal section taken through the speed reduction mechanism of the gyro vertical, the plane of section being indicated by the line 11—11 of Figure 6 and the direction of view by the arrows.

Means are provided for indicating the extent of operation of the actuating means 48. However, instead of being concerned only with the extent of the actuator's operation, as would be the case were the device to be used only as an accelerometer, the instrument is provided also with means for comparing the extent of the actuator's operation with the duration thereof; and thereby is secured a direct reading of the velocity gained. Moreover, inasmuch as the instrument remains in continuous operation, it is sensitive to each acceleration of the instrument's carrier as the successive accelerations occur, and accordingly, it operates to sum up, or integrate the several velocity increments which produce the actual velocity of the carrier. This integrating mechanism 49 comprises a disc 171 mounted for rotation in a plane parallel to the plane of movement of the mass 121 and high enough thereabove to accommodate a roller 172 carried by the body 123 for rotation about an axis parallel to or coincident with the plane of movement of the body. The disc 171 is affixed to the lower end of a tubular shaft 173 which extends into a housing 174 formed on the under side of the inner casing 41; and within the housing 174 and rigid with the upper end of the shaft 173 is a worm wheel 176, enmeshed with a worm 177 (see Figure 11) carried by a transverse shaft 178 which also carries a worm wheel 179 enmeshed with a worm 181 rigid with the lower end of the shaft 62 of the gyro rotor 61 which projects through the bottom of the inner casing 41 into the speed reduction gear housing 174. Hence, the disc 171 is connected to the rotor 61 of the gyroscope to be driven thereby at constant but greatly reduced speed.

The transverse roller 172 is pressed upwards towards the disc 171 by a drum 186 revoluble about an axis parallel to the path of movement of the body 123. The drum 186 is carried by pivotal bearing pins 187 at one end of a frame 188 which is pivoted intermediate its ends as by axially aligned pins 189, the axis of which is parallel to that about which the drum 186 is revoluble. The other end of the frame 188 is weighted, as at 191, in such a manner that the drum is continuously urged upwards against the roller 172, which is thus pressed upwards against either the disc 171, or in the event that the body 123 is in its neutral position, against a stationary shaft 192 rigid with the gear housing 174 and extending downwards through the center of the tubular shaft 173. The function of the stationary shaft 192 is to provide a stationary rest for the transverse roller 172 when the latter is in the position assumed thereby when the carrier vehicle is not experiencing any acceleration, and thereby avoid the danger of introducing errors by "creeping" of the roller 172, which would be present were the roller 172 permitted to bear against the center of the rotating disc 171 when in its neutral position. The stationary shaft 192 is, however, of the smallest diameter practicable under the circumstances of its installation, so as to minimize the distance through which the mass 121 must move before the roller 172 is caused to turn as the result of its contact with the rotating disc.

It is apparent, therefore, that whenever the mass 121 is displaced from its neutral position, the drum, because of its interconnection to the rotating disc 171 by the transverse roller 172, is caused to turn; and the extent of its turning is proportional to the distance that the roller 172 moves outward from the axis of the disc's rotation, i. e., is proportional to the magnitude of the acceleration responsible for movement of the mass 121. It should be borne in mind, however, that the mass 121 will remain displaced only so long as there is an acceleration; i. e., so long as the velocity of the carrier vehicle continues to change, and that when the velocity becomes constant, the roller 172 will be returned to its neutral position at the center of the disc 171, whereupon the drum will cease to turn, and the indicator will retain its then position. Furthermore, when the carrier experiences a negative acceleration, the roller 172 will be carried in the opposite direction from the disc's center, so that it contacts a portion of the disc which is moving in the opposite direction from that which it contacts when a positive acceleration is experienced. Under these circumstances, the drum 186 is turned in the opposite direction, and proportionally with the extent of the displacement of the roller 172; i. e., proportionally with the magnitude of the deceleration.

Dial driving mechanism

Means including the dial 27 are provided for indicating the distance that the drum 186 is thus caused to turn. Affixed coaxially to the drum is a driving gear 196 enmeshed with a driven crown wheel 197, preferably of considerably greater diameter than the driving wheel 196, the larger gear 197 being affixed to the lower end of a shaft 198 upon the upper end of which the dial 27 is secured. The dial 27 is calibrated in units of velocity; the parts preferably being so proportioned that one revolution of the dial indicates a change in velocity of one hundred miles per hour, in which event, the dial would have one hundred equally spaced indicia, each indicating a change of speed of one mile per hour. Attained speeds of greater than one hundred miles per hour will be indicated by turning of the dial 27 beyond one full revolution, and no confusion as to the proper reading of the dial after it has made one or more complete revolutions is probable, because of the great differences in the "feel" of the ship, and other factors of which the pilot is aware without having to read any instruments, resulting from each 100 mile per hour change.

Theoretical demonstration

For the purpose of illustrating the feasibility of securing an accurate reading in terms of velocity from an apparatus sensitive to the accelerations responsible for that velocity, a discussion of the theory entailed in the instrument's design follows:

Letting M equal the mass in the bob 46, letting A equal its acceleration, and letting L equal the distance from its center of gravity to the axis of the shaft 107, In the first stage, due to the inertia of the bob 46, a turning moment is produced, the extent of this moment being expressed by the formula MAL. When acceleration A is positive, MAL is negative and bob 46 swings back; when negative, MAL is positive and bob 46 swings forward. In either event, however, the angular movement of the shaft 107 and the asociated parts effects the release of the mass 121 from the check of the detent 144.

In the second stage, the angular movement of the arms 109 and 112, being limited to the width of apertures 111 and 113, in which they respectively operate, ceases abruptly upon striking framework 114.

Letting $c$ equal the constant of proportionality determined solely by the strength of any one of the equal springs 136, 133, or 141, letting $x$ equal the linear displacement of the mass 121, and, letting $L'$ equal the distance from the axis of the shaft 107 to the line of action of the spring 137, In the third stage, due to its inertia, the mass 121 rolls on its wheels 125 either backward or forward along the guides 122, according, respectively, to whether the acceleration of the framework 114 is positive or negative; but in either event the movement of the mass 121 causes the tension of the spring 137 to vary, and a moment $cxL'$ is therefore produced. Since, however, the vertical shaft 107 is situated between the bob 46 and the line of action of the spring 137 $cxL'$ opposes MAL; and, as the mass 121 becomes more and more displaced, $cxL'$ increases proportionally; until, In the fourth stage, $cxL'$ finally equilibrates MAL, and so in this stage the vertical shaft 107 and the associated parts again assume their respective mean positions; causing thereby the relative movement between the mass 121 and the said framework 114 to stop abruptly due to the automatic action of the detent 144, and there is no further movement of the mass 121 with relation to the framework 114, so long as the acceleration of framework remains constant.

It is possible, however, that the acceleration of the carrier might further increase, in which event the proportional increase in MAL brings about a repetition of the foregoing stages. On the other hand, it is possible that the acceleration of the carrier might decrease, in which event there is a proportional decrease in MAL. But this results in $cxL'$ being the greater moment and consequently the vertical shaft 107 and the associated parts move angularly as before only this time the movement, being due to $cxL'$, is in the opposite direction. Nevertheless, as before, the detent 144 releases the mass 121, which this time is motivated by spring recoil. Hence, movement between the mass 121 and the framework 114 is stopped abruptly by the detent 144 the instant the two moments become equal. For instance, when the acceleration of the framework 114 subsides entirely, the value of MAL drops to zero; and, accordingly, the mass 121 is motivated toward its normal position by spring recoil until the value of $cxL'$ also drops to zero. But when this occurs, both moments being equal to zero, the detent 144 engages the mass 121, causing it to stop abruptly—in this particular instance, in its neutral position. In other words, the detent 144 functions to prevent the mass 121 from being carried by its own momentum, beyond the position appropriate to the acceleration responsible for its movement.

Designating the mass 121 as $M'$ and its acceleration as $A'$, its inertial force is $M'A'$. However, two separate sets of springs oppose movement of the mass 121; and inasmuch as the two sets are not identical in operation, it is more convenient to consider the mass 121 as being composed of two parts, upon each of which one of the two sets of springs operates. These two sets of springs are as follows: the set 126, which includes the two opposed springs 127 and 128, affects movement of the mass 121 only, whereas the set 134, which includes the springs 136 and 137 (the latter being connected to the bob 46 through the arm 112), has influence not only upon the mass 121, or $M'$, but also upon the mass 46, or M. Considering, therefore, that $m$ represents that portion of the mass 121 against which the set 126 reacts, then $M'-m$ may be regarded as the quantity of mass which reacts against the set 134, $m$ and $M'-m$ being, of course, in the ratio of the strength of the set 126 to that of the set 134. That is, $$\frac{m}{M'-m}=\frac{\text{set }126}{\text{set }134}$$

Accordingly, $(2c+c)x$ is the equal and opposite reaction of the springs to the inertial force $A'M$. Thus, $(2c+c)x=A'M$. But since $M'$ is being considered as composed of two parts $m$ and $M'-m$, then $$(2c+c)x=A'[m+(M'-m)]$$

or, $$2cx+cx=A'm+A'(M'-m)$$

Since the constant of proportionality of two equal, interconnected springs arranged end to end and moved at their point of connection is double that of either spring alone, the reaction of the set 134 to the inertial force $MA'$ can be expressed as $2cx$, and since $c'$ has been assigned as the constant of proportionality of the set 134, the reaction of the set 134 to the inertial force $(M'-m)A'$ can be expressed as $c'x$, or, $$2cx=mA' \qquad (1)$$

and, $$c'x=(M'-m)A'$$

Whenever the shaft 107 and the associated parts balance in their respective mean positions, $$cxL'=MAL \qquad (2$$

or multiplying Equation 2 by 2, $$2cxL'=2MAL$$

but, multiplying Equation 1 by $L'$, $$2cxL'=mA'L'$$

therefore, $$2MAL=mA'L$$

and, by arranging matters so that $2ML=mL'$, $$A=A'$$

It is apparent, therefore, that whenever the acceleration in space of the mass 121 coincides with that of the carrier, the turning moment exerted by the bob 46 and its associated parts will correspond to the opposite turning moment exerted against the vertical shaft 107; as is necessary for the detent 144 to move to its anchoring position.

Letting $C'$ equal a constant of proportionality designating the total strength of both sets 126 and 134 of springs, their total reaction, of course, will be equal to $C'x$; and since this reaction is due to the inertia of the mass 121, $$C'x=M'A'$$

and, as $$A'=A$$

$$C'x=MA$$

or, $$A=\frac{C'x}{M'}$$

Now, letting V equal the velocity of the carrier vehicle, $$V=\int A\,dt$$

and, $$V=\frac{C'}{M'}\int x\,dt \qquad (3)$$

i. e., the velocity of the instrument's carrier is proportional to the time integral of the displacement of the mass 121.

Theory of integrator

Now, that the integrating mechanism 49 can be relied upon to obtain mechanically the time integral of the displacement of the mass 121, and indicate that integral upon a direct reading dial, is demonstrated as follows:

Let $x'=$ a displacement of the mass 121 and its roller 172, resulting from an arbitrary acceleration experienced by the framework 114 for an arbitrary time $\Delta t'$.

$n'=$ number of revolutions of the roller during $\Delta t'$.

$r=$ radius of the roller.

$\omega=$ angular velocity of the disc 171.

Then $x'\Delta t'\omega 2\pi=$ linear distance turned through by a point on the disc at the distance $x'$ from its axis of rotation.

$\pi 2rn'=$ linear distance turned through by a point on the circumference of the roller; but since the roller rolls on the disc, these distances are equal.

Therefore,
$$\pi 2rn' = x'\Delta t'\omega 2\pi$$
or,
$$n' = x\Delta t'\frac{\omega}{r}$$

If, however, R is a reduction constant equal to the number of revolutions of the roller necessary to produce one revolution of the registry dial 27, then a rotation of the roller equal to $n'$ will be accompanied by a rotation of the registry dial equal to $n'$ divided by R. But $$\frac{n'}{R}$$

is equal to $$x'\Delta t'\frac{\omega}{r}$$

(the above value of $n'$) divided by R.
or,
$$\frac{n'}{R} = x'\Delta t'\frac{\omega}{rR}$$

N being a summation of increments, that is, the final reading of the registry dial, therefore, $$N = \sum \frac{n}{R} = \frac{\omega}{rR}\int x dt$$

But it has been shown by Equation 3 that $$v = \frac{C}{M'}\int x dt$$

And by making the constants $$\frac{\omega}{rR} \text{ and } \frac{C'}{M'}$$

equal, $$N = \frac{\omega}{rR}\int x dt = \frac{C'}{M'}\int x dt = v$$

Thus,
$$N = v$$

Hence, if the instrument is so designed that $$\frac{\omega}{rR} \text{ and } \frac{C'}{M}$$

are equal, one complete revolution of the dial 27 would represent one unit of velocity. In the construction illustrated, however, the value of $$\frac{\omega}{rR}$$

is but one hundredth of the value of $$\frac{C'}{M}$$

which is the reason that the dial 27 is calibrated to read uniformly from zero to one hundred. Hence, each complete revolution of the dial 27 indicates a change in velocity of 100 miles per hour, and each movement of the dial less than a complete revolution, indicates a change in velocity proportionally less than 100 miles per hour; i. e., a movement of the dial of one-tenth of a revolution indicates a change in velocity of 10 miles per hour, and so on.

Zero-setting mechanism

Obviously, however, to construct an instrument of the character described, which receives the impetus for its actuation solely from accelerations which it experiences, with such a degree of precision that it is utterly devoid of errors would be physically impossible. Actually, the device is sufficiently accurate to eliminate all but those errors of its reading which are so small as to be negligible. The danger does exist, however, that if the instrument is permitted to remain in operation indefinitely without compensating for such errors, as small as each of these errors is, they are apt to accumulate, and in that manner present a cumulative error of sufficient magnitude to impair the instrument's reliability. Therefore, I have found it expedient to provide means 52 for accurately resetting the dial and thereby eliminating all cumulative error which may have developed.

Figures 6, 7, 8:
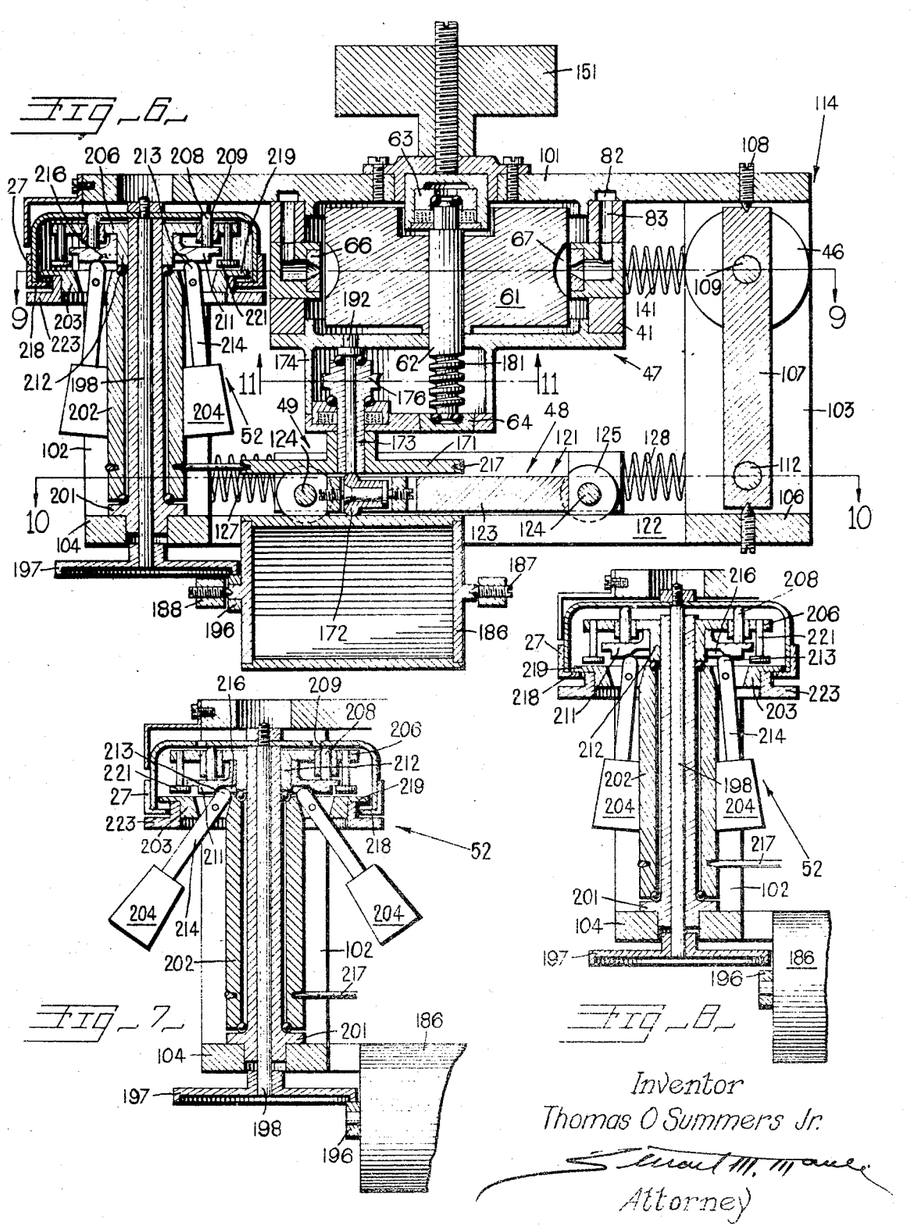
Figure 6 is a longitudinal, vertical, medial sectional view taken through the suspended portion of the mechanism, the plane of section being indicated by the line 6—6 of Figure 3, and the direction of view by the arrows. The parts are shown as they appear when the entire mechanism is at rest.
Figure 7 is a detail view taken similarly to Figure 6, through the indicating dial of the device and the zero-setting mechanism, the parts being illustrated in the positions assumed thereby while in operation.
Figure 8 is a view similar to Figure 7, but showing the parts in the positions assumed thereby when the rotor of the gyroscope almost has come to rest, but before the zero-setting device has had opportunity to function.

The spindle 201 within which the shaft 198 of the dial 27 is journaled, is rigid with and extends upwards from the forward transverse member 104. On the outside of the spindle 201, a sleeve 202 is journaled. A head 203 rigid with the upper end of the sleeve 202 and disposed below the dial 27 carries fly weights 204 adapted to swing outwards by centrifugal force when the sleeve 202 and head 203 rotate, as illustrated in Figure 7. Rigidly mounted upon the spindle 201 between the revoluble head 203 and the top of the dial 27 is a stationary head 206, provided at preferably diametrically opposite points but at different radial distances from its center with guiding holes within which pins 208 are slidably mounted. These pins 208 are so positioned that they register with complementary holes 209 in the top of the dial 27 when the dial is in its zero-indicating position (the position shown in Figure 6). The pins are urged downwards, preferably by gravity, and their lower ends rest upon a collar 211 mounted for axial sliding movement upon an annular flange 212 of the stationary head 206. This collar 211 rests upon the upper ends 213 of the arms 214 of the fly weights 204, and is provided with a coaxial circular recess 216 within which the ends 213 are received when the fly weights 204 are swung outwards. Hence, so long as the head 203 with its fly weights 204 rotates, the collar 211 is lowered, permitting the pins 208 to drop out of the holes 209 and liberating the dial 27 from the stationary head 206 so that it is free to be operated by the shaft 198 and drum 186; and since the sleeve 202 is connected as by a belt 217 with the disc 171, it follows that the pins 208 will be allowed to remain in their retracted position as long as the rotor 61 of the gyroscope spins. However, when the instrument is permitted to become idle, and as the speed of the rotor 61 approaches zero, the fly weights 204 drop and the ends 213 of the arms 214 move outwards out of the recess 216, raising the collar 211, which pushes the pins 208 upwards. If the dial 27 is at that time in such position that its holes 209 register with the pins, the pins will be pushed into the holes, anchoring the dial to the stationary head 206 with the dial 27 accurately in its zero-reading position. However, if the holes and the pins are not in registry, the entire dial 27 with its shaft 198 and the wheel 197 will be raised, separating the wheel 197 from the wheel 196 of the drum 186. At the same time, an inturned peripheral flange 218 on the dial 27 engages the under face of a radially extending flange 219 on the revoluble head 203, with the result that the dial will be turned until such time as the holes 209 and the pins 208 register, whereupon the dial will drop, seating the pins within the holes and thus anchoring the dial accurately in its zero-reading position, where it will be retained until the gyroscope is again started. Liability of entrance of the pins 208 into the holes 209 when the dial 27 is turned 180° from its zero-reading position is precluded by the fact that the two holes 209 and their respective pins 208 are located at different radial distances from the axis of the shaft 198 (see Figure 7 wherein the dial 27 is actually shown turned 180° from its zero-reading position).

When the instrument is in operation and the fly weights 204 are rotating, the collar 211 is supported by a plurality of bracket members 221 carried by the stationary head 206, with the result that the arms 214 are spaced below the collar, thus enabling them to rotate freely without the development of any friction against the collar.

*Speed determination*

It is important, for the accurate operation of the integrating mechanism 49, that the discs 171 operate at constant, predetermined speed. This can be easily and most accurately accomplished, inasmuch as it is coupled to the rotor 61 of the gyro to be driven thereby, but at such greatly reduced speed as compared with that of the rotor that even relatively great fluctuations of speed of the rotor have relatively little effect upon the speed of the disc. Means are provided for facilitating the accurate determination of the speed of the disc 171, or at least determining when it is operating at the proper speed, so as to enable the operator so to control the admission of air to the rotor housing that the rotor is driven at the proper speed. This speed-determining means conveniently takes the form of equal, alternate dark and light colored areas 222 on a flange 223 of the rotating head 203 which is visible through the glass front 22 of the instrument just below the dial 27. Therefore, the flange 223 serves not only as a convenient means for indicating to the observer that the rotor of the gyroscope is spinning and the instrument is in operation, but also, by observation of the edge of the flange 223 by means of a stroboscopic fork in the well known manner, the rate of air admittance can be regulated so as to assure rotation of the disc 171 at its proper speed.

I claim:

1. An instrument of the character described, comprising a mass mounted for oscillatory movement within said instrument whereby it is sensitive to accelerations of said instrument in the direction of said oscillatory movement to be moved by inertial forces proportionally with the magnitude of said accelerations; means for holding said mass stationary within said instrument when it arrives at the position appropriate to any acceleration responsible for its movement thereto, said holding means being operable only so long as the acceleration responsible for its operation remains constant, and a mechanical integrator associated with said mass to be operated thereby proportionally with movements thereof.

2. An instrument of the character described, comprising a mass mounted for oscillatory movement within said instrument whereby it is sensitive to accelerations of said instrument in the direction of said oscillatory movement to be moved by inertial forces proportionally with the magnitude of said accelerations, means for holding said mass stationary within said instrument when it arrives at the position appropriate to any acceleration responsible for its movement thereto, said holding means being operable by the same accelerations as those causing movements of said mass and remaining operative only so long as the acceleration responsible for its operation remains constant, and a mechanical integrator associated with said mass to be operated thereby proportionally with movements thereof.

3. An instrument of the character described, comprising a mass mounted for oscillatory movement within said instrument whereby it is sensitive to accelerations of said instrument in the direction of said oscillatory movement to be moved by inertial forces proportionally with the magnitude of said accelerations, releasable means for holding said mass stationary within said instrument, means interconnecting said mass and said holding means for moving said holding means to operative position when said mass reaches a position appropriate to the acceleration responsible for its movement, and a mechanical integrator associated with said mass to be operated thereby proportionally with movements thereof.

4. An instrument of the character described, comprising a mass mounted for oscillatory movement within said instrument whereby it is sensitive to accelerations of said instrument in the direction of said oscillatory movement to be moved by inertial forces proportionally with the magnitude of said accelerations, releasable means for holding said mass stationary, means responsive to any acceleration influencing movement of said mass for releasing said holding means, means interconnecting said mass and said holding means for moving said holding means to operative position when said mass reaches a position appropriate to the acceleration responsible for its movement, and a mechanical integrator associated with said mass to be operated thereby proportionally with movements thereof.

5. An apparatus of the character described comprising two masses having a common support, and movable in the same direction due to their inertia when said support is moved, an abutment stop fixed to said support greatly limiting the range of movement of one of said masses, a reversing connection between said masses including an interposed spring resistance whereby said masses move in opposing relationship, said masses also being movable by the recoil of said spring resistance, and holding mechanism associated with said support and operated by the said mass having the more limited range of movement to check the movements of said other mass.

6. An apparatus of the character described comprising two masses having a common support, and movable in the same direction due to their inertia when said support is moved, an abutment stop fixed to said support greatly limiting the range of movement of one of said masses, a reversing connection between said masses including an interposed spring resistance whereby said masses move in opposing relationship, said masses also being movable by the recoil of said spring resistance, and holding mechanism associated with said support and operated by the said mass having the more limited range of movement to check the movements of said other mass, the displacement of which providing proportional measurement of the various forces acting upon said masses.

7. An apparatus of the character described comprising two masses having a common support, and movable in the same direction due to their inertia when said support is moved, an abutment stop fixed to said support greatly limiting the range of movement of one of said masses, a reversing connection between said masses including an interposed spring resistance whereby said masses move in opposing relationship, said masses also being movable by the recoil of said spring resistance, holding mechanism associated with said support and operated by the said mass having the more limited range of movement to check the movements of said other mass, the displacement of which providing proportional measurement of the various forces acting upon said masses, and an integrating mechanism to measure the time integral of said displacement.

8. An apparatus of the character described comprising two masses having a common support, and movable in the same direction due to their inertia when said support is moved, an abutment stop fixed to said support greatly limiting the range of movement of one of said masses, a reversing connection between said masses including an interposed spring resistance whereby said masses move in opposing relationship, said masses also being movable by the recoil of said spring resistance, holding mechanism associated with said support and operated by the said mass having the more limited range of movement to check the movements of said other mass, the displacement of which providing proportional measurement of the various forces acting upon said masses, an integrating mechanism to measure the time integral of said displacement, a carrier to provide a pivotal suspension for said support, the strength of said spring resistance and the weight and location of said mass having the greater range of movement being correlated so that upon an acceleration of said carrier said support experiences no appreciable tendency toward pivotal movement, and a gyrovertical associated with said support to assure only horizontal displacements of said masses.

THOMAS O. SUMMERS, JR.